United States Patent [19]

Karikawa

[11] 4,221,478
[45] Sep. 9, 1980

[54] FILM FEEDING MECHANISM FOR CAMERA

[75] Inventor: Tohru Karikawa, Tokyo, Japan

[73] Assignee: Asahi Kogaku Kogyo Kabushiki Kaisha, Tokyo, Japan

[21] Appl. No.: 914,243

[22] Filed: Jun. 9, 1978

[30] Foreign Application Priority Data

Jun. 13, 1977 [JP] Japan .................................. 52/69725

[51] Int. Cl.² ............................................. G03B 1/06
[52] U.S. Cl. .................................................. 354/213
[58] Field of Search ................................ 354/212–218

[56] References Cited

U.S. PATENT DOCUMENTS

| 3,712,200 | 1/1973 | Beach | 354/213 |
| 3,757,658 | 9/1973 | Stoneham | 354/213 |
| 3,936,850 | 2/1976 | Goto | 354/212 |

FOREIGN PATENT DOCUMENTS

| 1807632 | 10/1969 | Fed. Rep. of Germany | 354/217 |
| 2435230 | 2/1975 | Fed. Rep. of Germany | 354/217 |

Primary Examiner—L. T. Hix
Assistant Examiner—Shelley Wade
Attorney, Agent, or Firm—Sughrue, Rothwell, Mion, Zinn and Macpeak

[57] ABSTRACT

A simple mechanism is provided for winding film in a film cassette in which a pawl engages a perforation in each film frame to actuate a film stop device which, in turn, disengages the pawl from the perforation to remove any force from the film during picture taking. Winding force is transmitted from a unidirectionally rotating film feed disc to a reciprocating link and then to a undirectionally rotating spool gear which drives the film spool.

7 Claims, 2 Drawing Figures

FILM FEEDING MECHANISM FOR CAMERA

BACKGROUND OF THE INVENTION

There has hitherto been proposed a variety of mechanisms for feeding a photographic film housed in a cassette and having a single perforation in each frame. In most film feeding mechanisms, a detection pawl is maintained resiliently urged even by a small force against the circumferential wall of the perforation from the time when the film is stopped by the detection pawl until the operation of the shutter is completed, thus incurring a risk of a film being inadvertently shifted due to vibrations or the like.

SUMMARY OF THE INVENTION

It is accordingly an object of the present invention to provide a film feeding mechanism for a camera, wherein when a frame of a photographic film, more particularly, a perforation in one frame of the film is shifted to a given position, so that any resilient force is no longer imposed on the film, whereby in association with the movement of the detection pawl, the rotation of a film-feed control disc is interrupted to stop the travelling of the film, thereby preventing the undesirable shifting of the film due to such as vibrations. In a camera using a photographic film housed in a cassette, it has been customary to dispose a winding shaft for a camera in the vicinity of a winding spool. It is however recommended, in some cases, that the winding shaft be disposed on the opposite side of the winding spool from the viewpoint of ease of operation. In such cases if the winding shaft is so arranged as to effect a reciprocating motion, it is possible to rotate a spool gear by means of a rack or the like, and if the winding shaft is so designed as to effect a unidirectional rotation alone, a complicated transmission mechanism, such as two pairs of helical gears positioned crosswise, is required. In the latter case, by providing a means for rotatiing a spool gear only in one direction intermittently by way of a link, which is coupled to a film-feed control disc rotating in one direction alone and effects a reciprocating motion, the simplicity in transmission mechanism may be achieved.

DETAILED DESCRIPTION OF THE INVENTION

The present invention will be described in more detail by way of a preferred embodiment.

Figure 1:
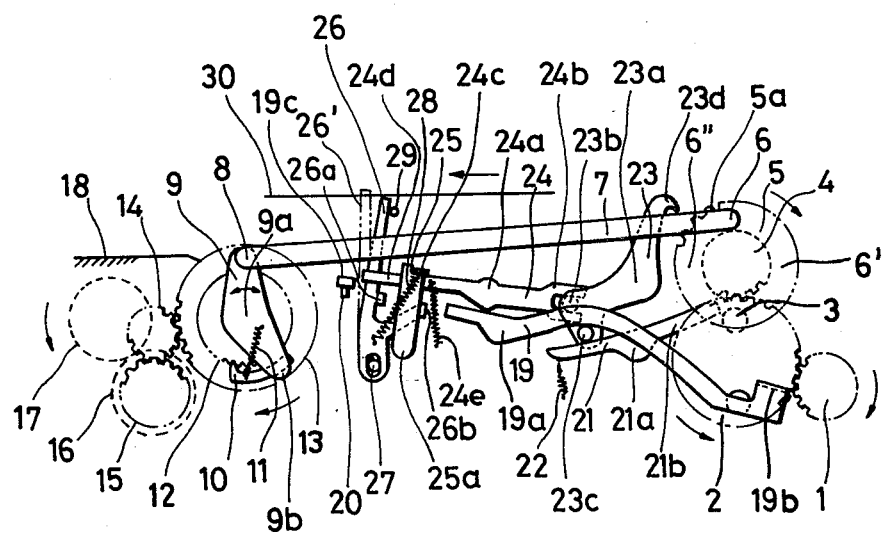
FIG. 1 shows the film feeding mechanism of the invention in the condition in which the picture-taking has been completed and the winding operation is going to start.
Figure 2:
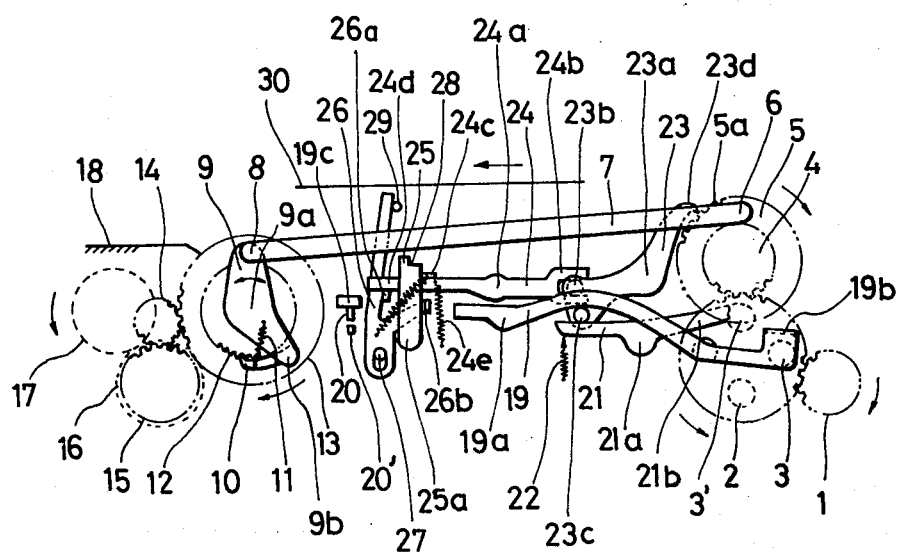
FIG. 2 shows the condition of the film feeding mechanism, immediately after the feeding of a film has been stopped.

Referring to FIGS. 1 and 2, shown at 1 is a gear which is directly coupled to a winding shaft adapted to rotate through a given angle in one direction alone (in a direction of the arrow), and which is in mesh with a gear 4 by way of a setting gear 2 having an upright pin 3 thereon. Mounted on the same shaft as gear 4 is a film-feed control disc 5, which has a series of circumferential stop teeth 5a and is coupled by means of a shaft 6 to a link 7. Link 7 is coupled by means of a shaft 8 to a bell crank 9 which, in turn, is mounted on a shaft 9a on which is also mounted a drive gear 12. By the cooperation of a pawl 10 connected by means of a shaft 9b to bell crank 9 and a spring 11 connecting bell crank 9 and pawl 10 to each other and biasing the pawl 10 against drive gear 12, bell crank 9 and drive gear 12 constitute a one-way clutch. Drive gear 12 and a gear 13 are directly connected each other, and these two gears are in meshing relation to a spool gear 17 provided in a cassette by way of gears 14, 15 and 16. Designated at 18 is a reverse rotation preventive spring adapted to act on gear 13. In the meantime, a film is shifted a given length by the rotation of control disc 5. Since the degree of rotation of control disc 5 is dependent on the amount of film being wound on the spool, it is preferable that a slip mechanism be provided between gear 4, which rotates in only one direction, and control disc 5. Shown at 19 is a setting lever, which is pivotally moved about a shaft 19a, and has at one end a bent portion 19b adapted to engage setting pin 3 and at the other end an arm end 19c adapted to engage a mirror setting lever or shutter setting lever 20. A lever 21 for stopping the winding operation, which is rotated about a shaft as at 21a, has an end portion 21b adapted to extend into or retract from a rotational zone of setting pin 3. Stop lever 21 is so loaded as to rotate clockwise under the force of a spring 22. A film stopping lever 23 rotating about a shaft as at 23a has at one end a pawl 23d adapted to engage one of stop teeth 5a and at the other end a pin 23b, and a pin, 23c which is positioned within the operational regions of both stop lever 21 and setting lever 19. An operating lever 24 rotating about a shaft as at 24a has at one end a forked portion 24b adapted to receive therein pin 23b, and in the other arm portion an end portion 24d and a projection 24c. Operating lever 24 is so loaded as to rotate counterclockwise under the force of a spring 24c. A locking lever 25 rotating about a shaft as at 25a has a stepped portion adapted to arrest bent portion 24c of operating lever 24, and is so loaded as to rotate clockwise under the force of a spring (not shown). A detection pawl 26 rotatable and slidable relative to a pin 27 has a projection 26a opposing end portion 24d, and a bent portion 26b opposing the side surface of locking lever 25. Detection pawl 26 coupled by a spring 28 to bent portion 24c is so loaded as to slide upwards as well as to rotate clockwise by the force of spring 28. Detection pawl 26 is regulated by a stopper 29, so as to be brought into engagement with a perforation in any frame of a photographic film 30.

Operation of the film feeding mechanism will now be described.

FIG. 1 shows the film feeding mechanism in the condition in which the picture-taking has just terminated. Simultaneously, with the completion of the picture-taking operation, shutter or mirror setting member 20 is returned upwards to rotate setting lever 19 clockwise, whereby winding-operation stop lever 21 and film stop lever 23 are respectively rotated counterclockwise by way of pin 23c, and at the same time operating lever 24 is rotated clockwise by way of pin 23b. As a consequence, projection 24c of operating lever is arrested by the stepped portion of locking lever 25, so that operating lever 24 is retained at the position that the lever has assumed through the clockwise movement. Detection pawl 26 is thus urged upwards by virtue of the force of spring 28 while being in contact with stopper 29, and brought into contact with film 30 resiliently. Under this situation, end portion 21b of winding-operation stop lever 21 assumes a position retracted from the rotational zone of pin 3, and pawl 23d of film stop lever 23 assumes a position retracted from any of stop teeth 5a, such that setting gear 2 and film-feed controlling disc 5 may be free to rotate. By the rotation in the direction of the arrow of winding gear 1 and setting gear 2, the shutter setting or mirror setting lever 20 will be set at a lower position by means of setting pin 3, bent portion 19b and setting lever 19. At the same time, control disc 5 is rotated in the direction of the arrow, with shaft 6 moving in the direction of the arrow to assume positions 6' and 6'' successively. The rotation of control disc 5, and hence shaft 6, is converted to a reciprocating movement of link 7, which reciprocating movement is transmitted by way of bell crank 9 and drive gear 12 to film spool gear 17 so as to rotate the gear 17 intermittently and unidirectionally, thereby shifting film 30 in the direction of arrow. When the film is further shifted, and a perforation in one frame of the film meets detection pawl 26, then detection pawl 26 is fitted in that perforation to such an extent that projection 26a of pawl 26 contacts arm end 24d of operating lever 24. Detection pawl 26 is turned counterclockwise as the film is shifted forwards, and when that perforation arrives at a predetermined position, the detection pawl assumes a biased position shown at 26' in FIG. 1. At this instant, bent portion 26b of detection pawl 26 urges locking lever 25 counterclockwise so that projection 24c of operating lever 24 disengages from the stepped portion of locking lever 25. Operating lever 24 thus rotates counterclockwise under the force of spring 24e to depress projection 26a. Detection pawl 26 thus disengaged from the perforation is then urged clockwise under the force of spring 28 and stops when same engages stopper 29, to assume the condition as shown in FIG. 2. Simultaneously with this movement, film stop lever 23 is also turned clockwise by way of forked portion 24b and pin 23b, whereby pawl 23d of lever 23 will engage one of stop teeth 5a to interrupt rotation of control disc 5, thereby halting the feeding of the film. At the same time, winding-operation stop lever 21 is also turned by way of pin 23c under the force of spring 22, to thereby cause end portion 21b to extend into the rotating zone of pin 3. At this time, by virtue of the action of the above-described slip mechanism, gear 4 remains free to rotate, whereas winding gear 1 and setting gear 2 continue to rotate and stop when pin 3 has urged setting lever 19 counterclockwise by the end 19b and turned to a position 3'. By the counterclockwise movement of setting lever 19, the shutter setting or mirror setting lever 20 is urged to a position 20'. The setting operation is thus terminated.

When a perforation arrives at a predetermined position, the detection lever disengages from the perforation, and the feeding of the film is stopped, and the film is maintained free from any force. The undesired shift of the film during the stop is thus avoided. Furthermore, arrangements are made for a unidirectional rotation of the control disc coupled to the winding gear effecting a unidirectional rotation to be converted by means of the link to a reciprocating movement; the reciprocating movement is transmitted by way of the one-way clutch to the film spool to thereby drive same intermittently; and when the film arrives at a predetermined position, the feeding of the film is stopped. By such arrangements, there is eliminated a need to provide a complicated transmission mechanism as well as to limit the position of the winding operation member to the vicinity of the film spool, but such a winding member as in the present invention is permitted to be positioned on the opposite side of the spool without impairing the operability of the mechanism. This provides a greatly increased freedom in design of the film winding mechanism.

What is claimed is:

1. A film feeding mechanism in a camera having a winding shaft rotating in one direction alone for feeding a photographic film, housed in a cassette and having a single perforation in each frame, wherein the improvement comprises:

a film stop means for interrupting the travel of said film actuated; and a detection pawl adapted to fit in a perforation in each frame of the film when said perforation arrives at a predetermined position of the end of film winding, said detection pawl actuating said film stop means when said perforation has been engaged whereby said film stop means interrupts film travel and disengages said pawl from said perforation; and wherein said film stop means comprises:

a film stop lever;

an operating member, said operating member being movable between a first position in which said film stop means is actuated and said pawl is disengaged and a second position in which said film stop means is not actuated; and a locking member movable between a first position for locking said operating member in its second position and a second position in which said operating member is released, said locking member being biased to assume said first position and said operating member being biased to assume first position, said pawl including a means for moving said locking member to its second position at the end of film winding.

2. A film feeding mechanism in a camera having a winding shaft rotating in one direction alone for feeding a photographic film, housed in a cassette and having a single perforation in each frame, said mechanism being of the type having a winding means for transmitting unidirectional rotation to a film spool gear, the improvement comprising:

a film stop means for interrupting the travel of said film when actuated;

a detection pawl adapted to fit in a perforation in each frame of the film when said perforation arrives at a predetermined position of the end of film winding, said detection pawl actuating said film stop means when said perforation has been engaged whereby said film stop means interrupts film travel and disengages said pawl from said perforation;

a film-feed control disc operatively coupled to said rotatable winding means for unidirectional rotation;

a link coupled at one end to said control disc for converting the rotary motion of said disc into reciprocating motion; and a spool gear coupled to said link through a one way clutch for intermittent unidirectional rotation relative to the film-feed control disc, whereby the rotation of said control disc is transmitted through said link to said spool gear to wind said film.

3. A film feeding mechanism according to claim 2, wherein said film stop means comprises a film stop lever and an operating member, said operating member being movable between a first position in which said film stop means is actuated and said pawl is disengaged and a second position in which said film stop means is not actuated; and a locking member moving movable between a first position for locking said operating member in its second position and a second position in which said operating member is released, said locking member being biased to assume said first position and said operating member being biased to assume said first position, said pawl including a means for moving said locking member to its second position at the end of film winding.

4. A film-feeding mechanism according to claim 2, wherein said link is pivotably coupled to said control disc at a point spaced from the center thereof and said one way clutch comprises a pivotable bell crank having a first end to which the other end of said link is connected and a second end on which a pawl is mounted, said pawl engaging ratchet teeth on a drive gear operatively coupled to said spool gear.

5. A film feeding mechanism in a camera for feeding film housed in a cassette and having a single perforation in each film frame, said mechanism of the type having a winding means for transmitting unidirectional rotation to a film spool gear the improvement comprising:

a film-feed control disc operatively coupled to said rotatable winding means for unidirectional rotation;

a link coupled at one end to said control disc for converting the rotary motion of said disc into reciprocating motion; and a spool gear coupled to said link through a one way clutch for intermittent unidirectional rotation relative to the film-feed control disc, whereby the rotation of said control disc is transmitted through said link to said spool gear to wind said film.

6. A film feeding mechanism according to claim 5, wherein said link is pivotably coupled to said control disc at a point spaced from the center thereof and said one way clutch comprises a pivotable bell crank having a first end to which the other end of said link is connected and a second end on which a pawl is mounted, said pawl engaging ratchet teeth on a drive gear operatively coupled to said spool gear.

7. A film-feeding mechanism in a camera having a winding shaft rotating in one direction alone for feeding a photographic film, housed in a cassette and having a single perforation in each frame, wherein the improvement comprises:

a film stop lever movable between a stopping position in which film travel is interrupted and a release position in which film travel is permitted, said film stop lever moving to its stopping position when actuated;

a detection pawl adapted to fit in a perforation in each frame of the film when said perforation arrives at a predetermined position of the end of film winding;

an operating lever movable between a first position in which said film stop lever is held in its stopping position and said pawl is disengaged, and a second position in which said film stop lever is held in its release position, said operating lever being biased toward said first position and mechanically coupled to said film stop lever such that movement of said operating lever toward said first position will cause corresponding movement of said film stop lever toward its stopping position; and a locking member movable between a first position for locking said operating lever in its second position and a second position in which said operating lever is released, said pawl including a means for moving said locking member to its second position at the end of film winding whereby said operating member is released to move toward its first position to cause corresponding movement of said film stop lever toward its stopping position, said operating lever in its second position abutting said detection pawl and disengaging said detection pawl from said perforation.

* * * * *